(12) United States Patent
Banks et al.

(10) Patent No.: US 10,359,240 B2
(45) Date of Patent: Jul. 23, 2019

(54) COMPRESSOR SYSTEM WITH THERMALLY ACTIVE HEAT EXCHANGER

(71) Applicant: Ingersoll-Rand Company, Davidson, NC (US)

(72) Inventors: Russell A. Banks, Huntersville, NC (US); James Christopher Collins, Mooresville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 763 days.

(21) Appl. No.: 14/463,091

(22) Filed: Aug. 19, 2014

(65) Prior Publication Data

US 2015/0053390 A1 Feb. 26, 2015

Related U.S. Application Data

(60) Provisional application No. 61/868,074, filed on Aug. 20, 2013.

(51) Int. Cl.
*F28F 13/12* (2006.01)
*F28F 1/40* (2006.01)
(Continued)

(52) U.S. Cl.
CPC .............. *F28F 13/12* (2013.01); *F04C 29/02* (2013.01); *F04C 29/042* (2013.01); *F16N 39/02* (2013.01); *F28D 7/16* (2013.01); *F28F 1/40* (2013.01); *F28D 2021/0049* (2013.01); *F28F 2255/04* (2013.01)

(58) Field of Classification Search
CPC ...... F28F 1/40; F28F 9/24; F28F 13/02; F28F 13/12; F28F 2255/04; F28D 7/16; F28D 2021/0049
See application file for complete search history.

(56) References Cited

U.S. PATENT DOCUMENTS 2,161,887 A * 6/1939 Ramsaur ................. F28D 1/053
138/38
4,044,796 A * 8/1977 Smick ...................... F22B 37/06
122/155.2
(Continued)

FOREIGN PATENT DOCUMENTS

GB 2479262 A * 10/2011 ........... F28D 7/1684
JP 58182096 A * 10/1983 .............. F28F 13/12
(Continued)

OTHER PUBLICATIONS

European Search Report, EP14181567, dated Mar. 23, 2015.

*Primary Examiner* — Devon Russell
(74) *Attorney, Agent, or Firm* — Taft Stettinius & Hollister LLP (57) ABSTRACT

A compressor system is disclosed that includes at least one fluid compressor for compressing a working fluid and a lubrication supply system operable for supplying lubrication fluid to the compressor. A heat exchanger is provided for controlling the temperature of the lubrication fluid. The heat exchanger includes a housing for holding a plurality of lubrication fluid passageways. A shape memory alloy (SMA) member is positioned within at least one of the plurality of lubrication fluid passageways to increase turbulence in the lubrication fluid at relatively high temperatures.

10 Claims, 8 Drawing Sheets

(51) Int. Cl.
*F16N 39/02* (2006.01)
*F04C 29/02* (2006.01)
*F04C 29/04* (2006.01)
*F28D 7/16* (2006.01)
*F28D 21/00* (2006.01)

(56) References Cited

U.S. PATENT DOCUMENTS

| | | | |
|---|---|---|---|
| 4,296,779 A * | 10/1981 | Smick | F28F 13/12 |
| | | | 138/38 |
| 4,727,907 A * | 3/1988 | Duncan | F28F 13/12 |
| | | | 138/38 |
| 4,841,730 A | 6/1989 | McDonald | |
| 4,862,955 A | 9/1989 | Itakura | |
| 5,369,883 A * | 12/1994 | So | F28D 9/0043 |
| | | | 29/890.039 |
| 5,492,408 A * | 2/1996 | Alfare | B01F 5/0617 |
| | | | 366/337 |
| 6,186,223 B1 | 2/2001 | Bergh et al. | |
| 6,244,333 B1 | 6/2001 | Bergh et al. | |
| 6,273,183 B1 * | 8/2001 | So | F28D 1/0333 |
| | | | 165/109.1 |
| 6,446,876 B1 | 9/2002 | Stefano et al. | |
| 6,886,622 B2 | 5/2005 | Villhard | |
| 7,431,638 B2 | 10/2008 | Kozdras et al. | |
| 7,540,431 B2 | 6/2009 | Kozdras et al. | |
| 2003/0188850 A1 * | 10/2003 | Liu | B01D 53/8675 |
| | | | 165/109.1 |
| 2005/0000574 A1 | 1/2005 | MacGregor et al. | |
| 2008/0099193 A1 | 5/2008 | Aksamit et al. | |
| 2009/0050428 A1 * | 2/2009 | Kloucek | F16F 15/002 |
| | | | 188/378 |
| 2009/0200007 A1 | 8/2009 | Foy et al. | |
| 2011/0265465 A1 * | 11/2011 | Oesterle | F01N 3/043 |
| | | | 60/320 |
| 2014/0102673 A1 * | 4/2014 | Joardar | F28F 13/12 |
| | | | 165/109.1 |

FOREIGN PATENT DOCUMENTS

| | | | | |
|---|---|---|---|---|
| JP | 59231397 A | * | 12/1984 | F28F 13/12 |
| JP | 01121694 A | * | 5/1989 | |
| JP | 2008096048 A | * | 4/2008 | F28F 1/40 |
| WO | 2011090482 A2 | | 7/2011 | |
| WO | WO 2016121949 A1 | * | 8/2016 | C08F 2/01 |

* cited by examiner

COMPRESSOR SYSTEM WITH THERMALLY ACTIVE HEAT EXCHANGER

CROSS REFERENCE TO RELATED APPLICATIONS

The present application claims the benefit of U.S. Provisional Patent Application 61/868,074 filed Aug. 20, 2013, the contents of which are incorporated herein by reference in their entirety.

TECHNICAL FIELD

The present invention generally relates to industrial air compressor systems and more particularly, but not exclusively, to compressor systems having thermally active heat exchangers.

BACKGROUND

Industrial compressor systems generally produce large volumes of pressurized fluid such as air or the like. Compressor systems typically include cooling systems to cool fluids such as high temperature compressed air, lubrication fluids and coolant. Some existing systems have various shortcomings relative to certain applications. Accordingly, there remains a need for further contributions in this area of technology.

SUMMARY

One embodiment of the present invention is a unique compressor system with a thermally active heat exchanger. Other embodiments include apparatuses, systems, devices, hardware, methods, and combinations for compressor systems with a unique method of cooling fluids in a compressor system with a heat exchanger having a turbulator formed from a shaped memory alloy (SMA) that changes form as a function of temperature. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Industrial compressor systems are configured to provide large quantities of compressed fluids at a desired temperature, pressure and mass flow rate. Some compressor systems use fluid to fluid heat exchangers to control the temperature of compressed fluids at various stages within the system. The term "fluid" should be understood to include any gas or liquid medium used in the compressor system as disclosed herein. In one form the compressed working fluid is disposed in fluid communication with a user's compressed working fluid network. In some forms the present application can be directed to delivery of pressurized fluid with more than one fluid constituency such as a mixture of air and lubrication fluids including oil or the like. In other forms, the present application can be directed to the delivery of pressurized oil free working fluid from an oil free compression chamber environment. More specifically, the compression chamber which houses the rotatable rotors is free of oil and oil related materials whether considered a petrochemical based oil or a synthetic based oil. The term oil as utilized herein is intended to refer generally to a class of lubricants that are either petroleum or synthetic based and have a variety of viscosities; non limiting examples include grease or oil.

Conventional oil-flooded rotary screw compressor systems use oil to cool the compressed air. Contact-cooled rotary screw compressors inject oil into the compressor module to lubricate bearings, seal compression component gaps, and cool the compressed gas during the compression process. This type of compression system mixes the gas and oil during compression and then separates the fluid constituents in a downstream process. Typically oil flow into the compressor module can be regulated using an injection orifice or the like. The flow rate through an orifice varies only slightly with operating pressure and temperature changes. In addition to oil flow rate, the oil temperature must be regulated because the viscosity varies as a function of temperature. If the temperature of the oil is below a predefined minimum the system may not provide enough oil to the bearings. If the temperature of the oil is above a predefined maximum then the oil may break down and performance will decline.

In some systems, oil temperature is controlled with a thermal control valve which mixes the oil flow from relatively hot and relatively cold streams. The oil temperature can be controlled with a heat exchanger to cool part or all of the oil to a desired temperature. In some aspects, conventional heat exchangers have limited ability to meet a specific temperature due to lack of active control systems. Heat exchangers can be defined by an overall heat transfer coefficient, 'U' which measures the effectiveness of transferring heat between two streams of fluids. When the oil flow rate is relatively constant in a compressor system, the heat exchanger has limited capability to adjust the heat transfer coefficient value. In conjunction with the 'U' value, the heat transfer capability of a heat exchanger also depends on the effective heat transfer area 'A' that the fluids are exposed to. The combination of heat transfer coefficient and effective heat transfer area, defines the level of performance of the heat exchanger. For certain applications, it can be desirable to control heat transfer in a heat exchanger. The present disclosure provides for a thermally active control in a heat exchanger for a compressor system.

Figure 1:
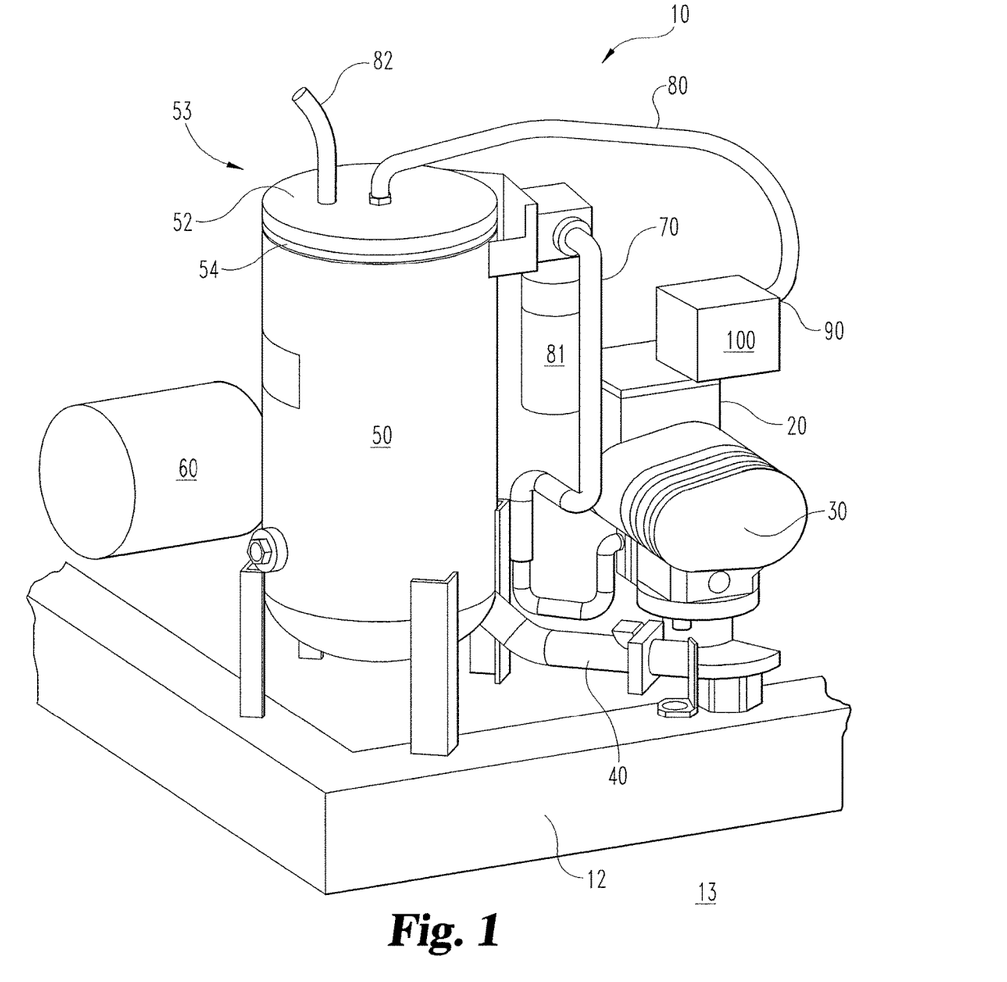
FIG. 1 is a perspective view of a compressor system according to one embodiment of the present disclosure.

Referring now to FIG. 1, an exemplary compressor system 10 is shown in perspective view. The compressor system 10 includes a primary motive source 20 such as an electric motor, an internal combustion engine or a fluid-driven turbine and the like. The compressor system 10 can include a compressor 30 that may include multi-stage compression. The compressor 30 can include a screw, centrifugal, axial and/or positive displacement compression means. The primary motive source 20 is operable for driving the compressor 30 via a drive shaft (not shown) to compress gaseous fluids such as air and oil vapor or the like.

A structural base 12 is configured to support at least portions of the compressor system 10 on a support surface 13 such as a floor or ground. Portions of the compressed working fluid discharged from the compressor 30 can be transported through more one or more conduits 40 to a sump or separator tank 50 for separating fluid constituents such as air and oil or the like. One or more coolers 60 such as an intercooler can be operably coupled with the system 10 for cooling working fluids to a desired temperature. The one or more coolers 60 can cool fluids such as compressed air or oil to a desired temperature. The compressor system 10 can also include a controller 100 operable for controlling the primary motive power source 20 and various valving and fluid control mechanisms (not shown) between the compressor 30 and the cooler 60. A blowdown valve 90 can be operably coupled to the system 10 to control pressure in the separator tank 50.

The separator tank 50 can include a lid 52 positioned proximate a top portion 53 thereof. A seal 54 can be positioned between the lid 52 and separator tank 50 so as to provide a fluid tight connection between the lid 52 and the separator tank 50. Various mechanical means such as threaded fasteners (not shown) or the like can be utilized to secure the lid 52 to the separator tank 50. A blowdown conduit 80 can extend from the separator tank 50 to the blowdown valve 90. The blowdown valve 90 is operable for reducing pressure in the separator tank 50 when the compressor 30 is unloaded and not supplying compressed air to an end load. An air supply conduit 82 can be operably coupled to the separator tank so as to deliver compressed air to a separate holding tank (not shown) or to an end load for industrial uses as would be known to those skilled in the art. An oil supply conduit 70 can extend from the separator tank 50 to the compressor 30 to supply oil that has been separated from the working fluid in the separator tank 50 to the compressor 30. One or more filters 81 can be used in certain embodiments to filter particles from the oil and/or separate contaminates such as water or the like from working fluids in the compressor system 10.

Figure 2:
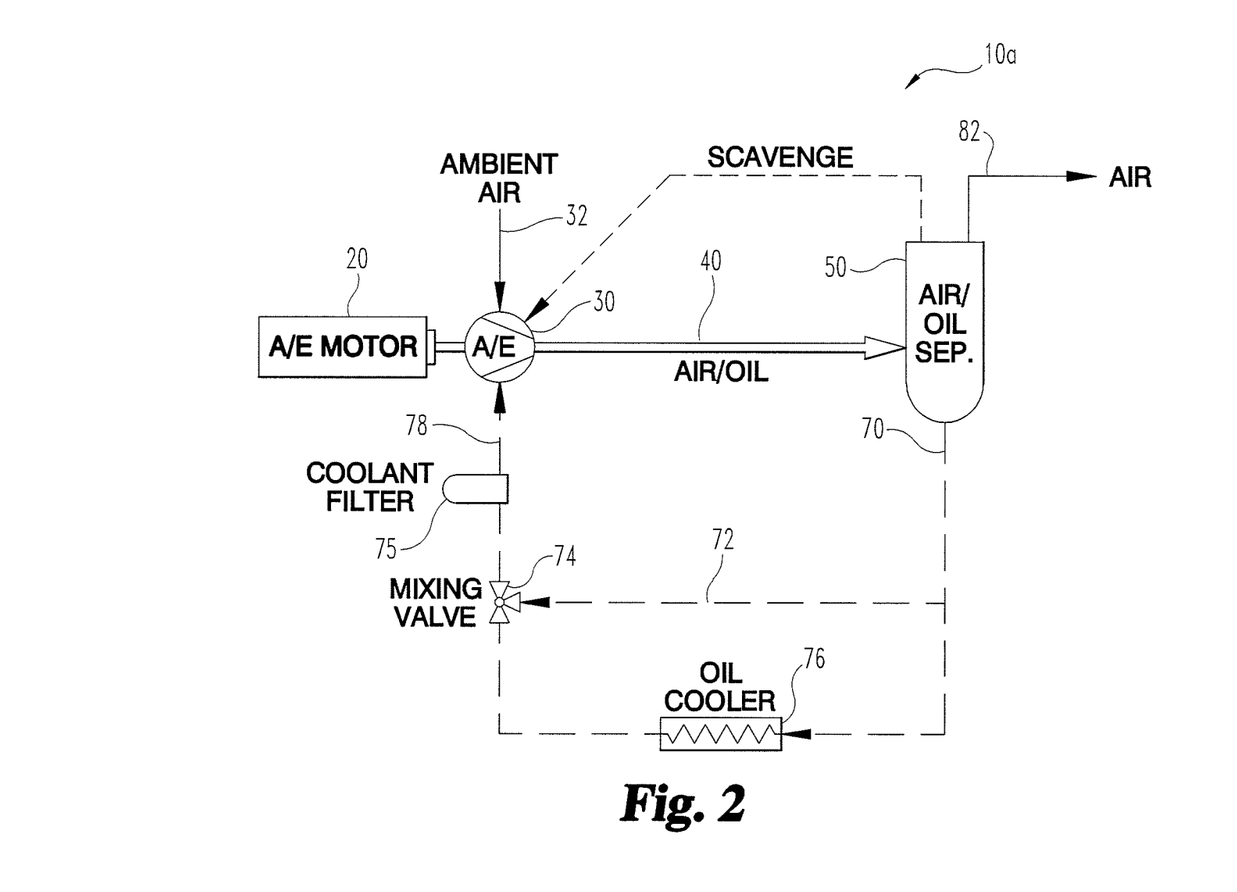
FIG. 2 is a schematic view of a portion of the compressor system of FIG. 1 illustrating a cooling system with a mixing valve according to one embodiment of the present disclosure.

Referring now to FIG. 2, a compressor system 10A is illustrated in schematic form. A motive power source 20 such as an electric motor is operable to drive an air end compressor 30 to a desired rotational speed. The compressor 30 receives ambient air through an air inlet 32 and discharges relatively high pressure and high temperature compressed air to a compressed fluid discharge or outlet conduit 40. In this exemplary embodiment, the compressor system can include a lubricated compressor such as a screw compressor or the like wherein the discharge conduit 40 includes a high pressure fluid comprising compressed air and oil as is known to those skilled in the art. It should be understood that the compressor system of the present application can utilize any type of compressor system such as centrifugal, positive displacement gear type, piston type, axial flow or others including oil free compression as would be known to the skilled artisan. In this non-limiting example, the compressed fluid is supplied to an air/oil separator tank 50 through the discharge conduit 40 such that compressed air and oil can be separated. The compressed air can be discharged from the separator tank 50 through a compressed air supply conduit 82. The oil can be transported from the separator tank 50 through an oil supply conduit 70 connected thereto. The oil supply conduit 70 can be routed to an oil bypass conduit 72 and/or through an oil cooler 76. A thermal control mixing valve 74 is operable for mixing a portion of the oil that flows through the oil bypass conduit 72 and a portion of oil that flows through the oil cooler 76 so that oil is delivered to the compressor 30 at a desired temperature. In some forms, all of the oil egressing from the separator tank 50 will be transferred through the oil cooler 76 prior to flowing through the oil inlet 78 operably coupled to the air end compressor 30. In some embodiments, an oil coolant filter 75 can be installed to filter undesirable particles from the oil prior to entering the compressor 30.

The compressed air supply conduit 82 can be routed to an air cooler or heat exchange unit 60 (see FIG. 1) for cooling the hot compressed air to a desired temperature. It should be understood that while only one air cooler and one oil cooler are illustrated in this exemplary embodiment, that multiple air coolers and/or multiple oil coolers are contemplated by the present disclosure. The compressed air can exit the air cooler 60 through an air cooler outlet (not shown) and can be routed through an optional moisture separator (also not shown) so as to separate water or other liquid constituents from the compressed air through a water drain whereby relatively pure compressed air without contaminating liquids can be delivered to an end load.

The function of the thermal control and mixing (TCV) valve 74 is functionally separated from the oil cooler 76. The purpose of the TCV 74 is to maintain the oil at a predetermined temperature for compressor injection, based on compressor discharge temperature. The valve 74 operates in basically one of three modes. In a first mode, the thermal control valve allows full flow of cold, viscous oil (usually at compressor start-up or very cold ambient temperatures) to bypass the oil cooler 76 through bypass conduit 72 and return it to the compressor 30. As the compressor 30 warms up, the valve operates in a second mode, wherein the valve moves to a mixing position where it splits the oil flow between the oil cooler 76 and the cooler bypass 72 prior to mixing and recirculating the oil to the compressor 30. At very hot operating conditions, the valve 74 operates in a third mode, wherein the valve directs the full flow of oil to the oil cooler 76 prior to recirculating the oil to the compressor 30.

The function of the oil cooler 76 is to remove heat from the oil. In the illustrative form, the oil cooler 76 is a shell and tube heat exchanger. Other types of heat exchangers as known by those skilled in the art are also contemplated by the present disclosure. A traditional oil cooler is a passive heat exchanger, as the component itself has no means to adjust how much heat is removed from the oil, other than by the mass, velocity, and fluid properties (e.g. viscosity, density, specific heat, and thermal conductivity, all as a function of temperature) of the oil moving through it. It is noted that oil mass flow and velocity traveling through the cooler 76 are both variables controlled by the thermal control valve operation.

The oil cooler 76 of the present disclosure includes a shape memory alloy (SMA) turbulator to actively adjust the overall heat transfer coefficient of the heat exchanger. A turbulator can be positioned in a fluid flow passageway to induce turbulence in the oil flow thereby increasing the heat transfer coefficient between the oil and the coolant. The fluid flow passageways for the oil can include cross-sections that are circular or other regular and irregular shapes. In some embodiments the oil cooler 76 with an SMA turbulator can replace the TVC mixing valve 74 as will be discussed further below.

Figure 3:
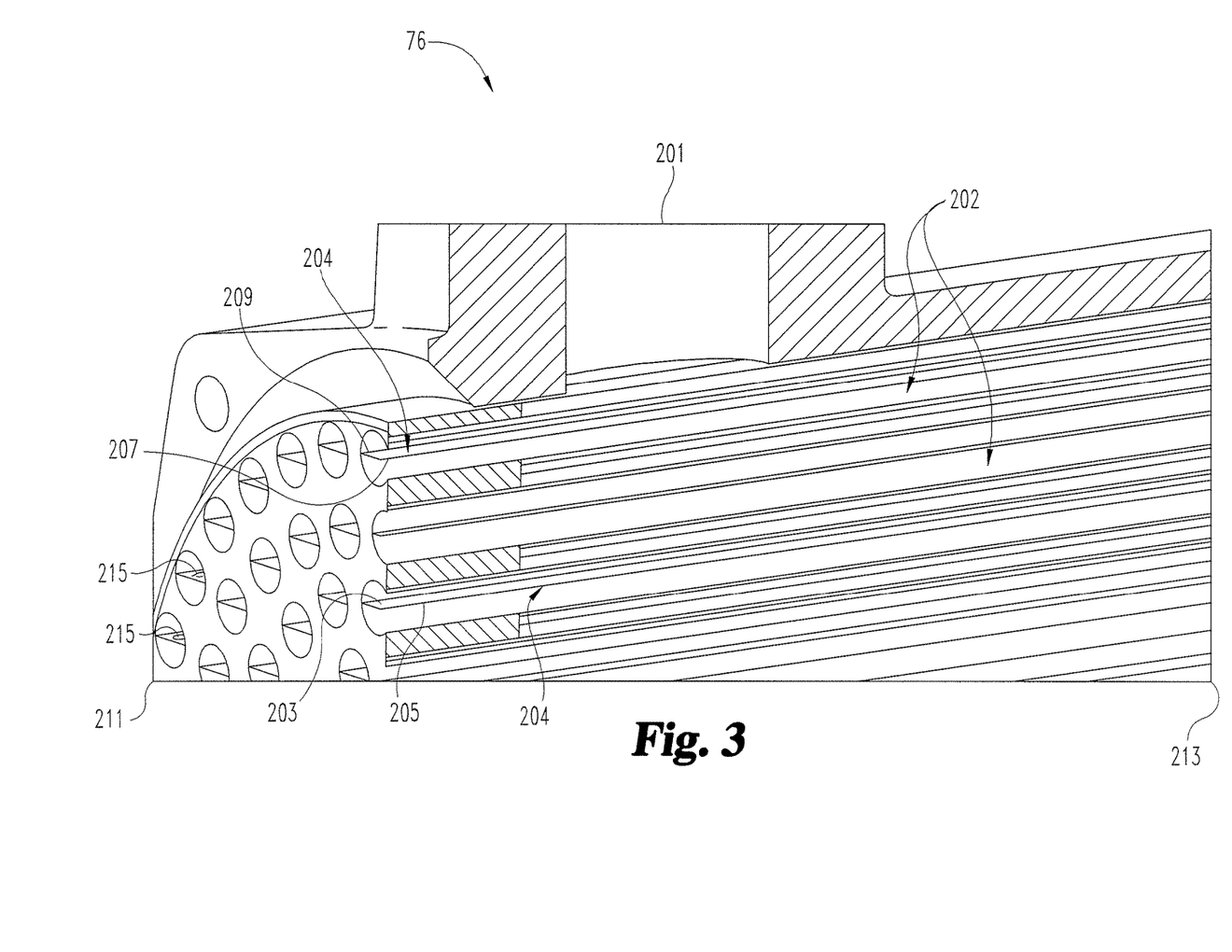
FIG. 3 is a perspective view of a heat exchanger partially cutaway showing turbulators in a substantially flat configuration at a relative low temperature.

With reference to FIG. 3, an illustrative thermally active shell and tube heat exchanger 76 is shown with a coolant inlet port 201 and a plurality of tubes 202 for directing oil flow there through. The shell and tubes can be formed from any material that facilitates a defined heat transfer between the oil and the coolant. The materials typically include conductive metals such as aluminum, stainless steel and copper or the like. An SMA turbulator strip 204 can be formed as an elongate substantially flat plate or bar or alternatively an elongate flat plate or bar at ambient conditions where the temperature is relatively low. One or more turbulator strips 204 can be positioned in one or more of the tubes 202. In the illustrative embodiment, each tube 202 includes a single SMA turbulator strip 204, although it is also contemplated that some tubes 202 may be devoid of SMA turbulator strips or alternatively house more than one SMA turbulator strip 204.

In some forms, the turbulator strips 204 can be free floating within the tubes 202. In other forms, the turbulator strips can be mechanically connected at one or more locations within a corresponding tube 202. For example, each turbulator strip 204 may be connected to a corresponding tube 202 in one or more locations via weld, braze, fastener, interference fit or other mechanical means known to those skilled in the art. The turbulator strips 202 can be an elongate flat strip, bar or plate extending along at least a portion of one or more tubes 204 at ambient conditions. Each turbulator strip 204 can include a top wall 203 and an opposing bottom wall 205 with a pair of side walls 207, 209 extending there between. The turbulator strip 204 can extend substantially along an entire length of the oil cooler 76 between first and second ends 211, 213 or alternatively extend less than the entire length of the oil cooler 76. In one form, the top and bottom walls 203, 205 can be substantially wider than the side walls 207, 209 or substantially smaller in alternate forms. In other forms the turbulator strip 204 may include more than four walls or less than four walls. In yet other forms the turbulator strip 204 may include arcuate portions or be completely circulator or ovalized in cross sectional shape. Each tube 202, may include two or more turbulator strips running parallel to one another along a length thereof. In other forms, the tubes 202 may include a plurality of intermittently positioned turbulator strips 204. One or more of the turbulator strips may include features 215 such as protruding members or recessed members or apertures extending partially or completely through one or more of the walls 203, 205, 207 or 209.

Figure 5:
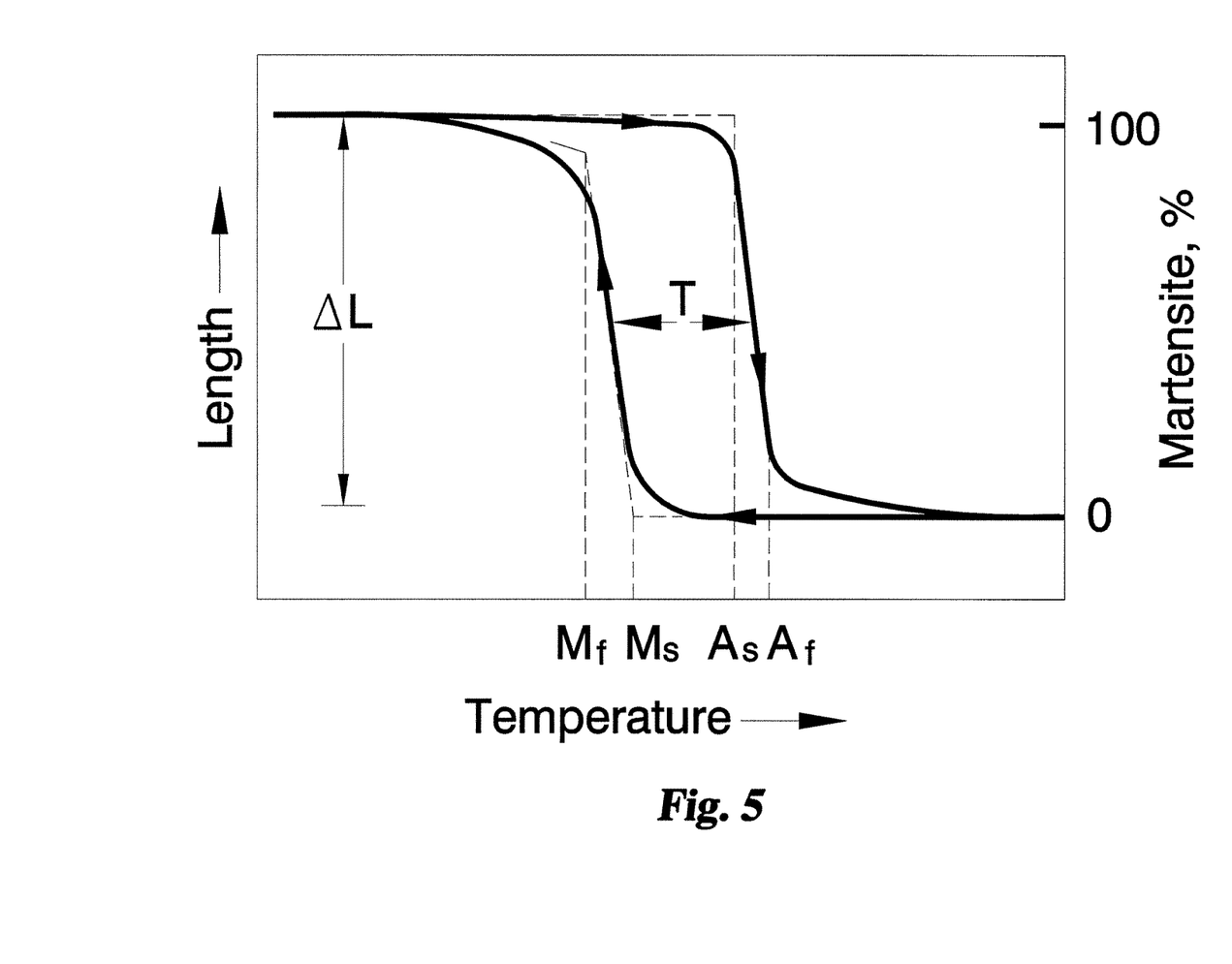
FIG. 5 is a plot of change of material length vs. temperature for materials having a defined percentage of Martensitic material composition.

The SMA turbulator strip 204 may comprise any shape memory alloy, such as a nickel-titanium alloy or a copper-based alloy which is capable of transitioning to a predetermined configuration in response to a change in temperature as would be known to those skilled in the art. This shape transformation is caused by the crystal structure of the SMA changing from a face centered cubic (FCC) form known as Martensite at a lower temperature, to a body centered (BC) form known as Austenite at a somewhat higher temperature. Other means for causing material to change in shape in response to a change in temperature are also contemplated by the present disclosure. These changes in structure allow the material to change shape from one predefined form to another, giving the material a 'memory'—hence a shaped memory form as a function of temperature. The shape transformation can be fully reversible by returning the material to the initial temperature. The process is graphically depicted in FIG. 5 (graphic ref.: ASM Handbook, Volume 2: Properties and Selection: Nonferrous Alloys and Special-Purpose Materials; Copyright© 1990 ASM International®).

Figure 4:
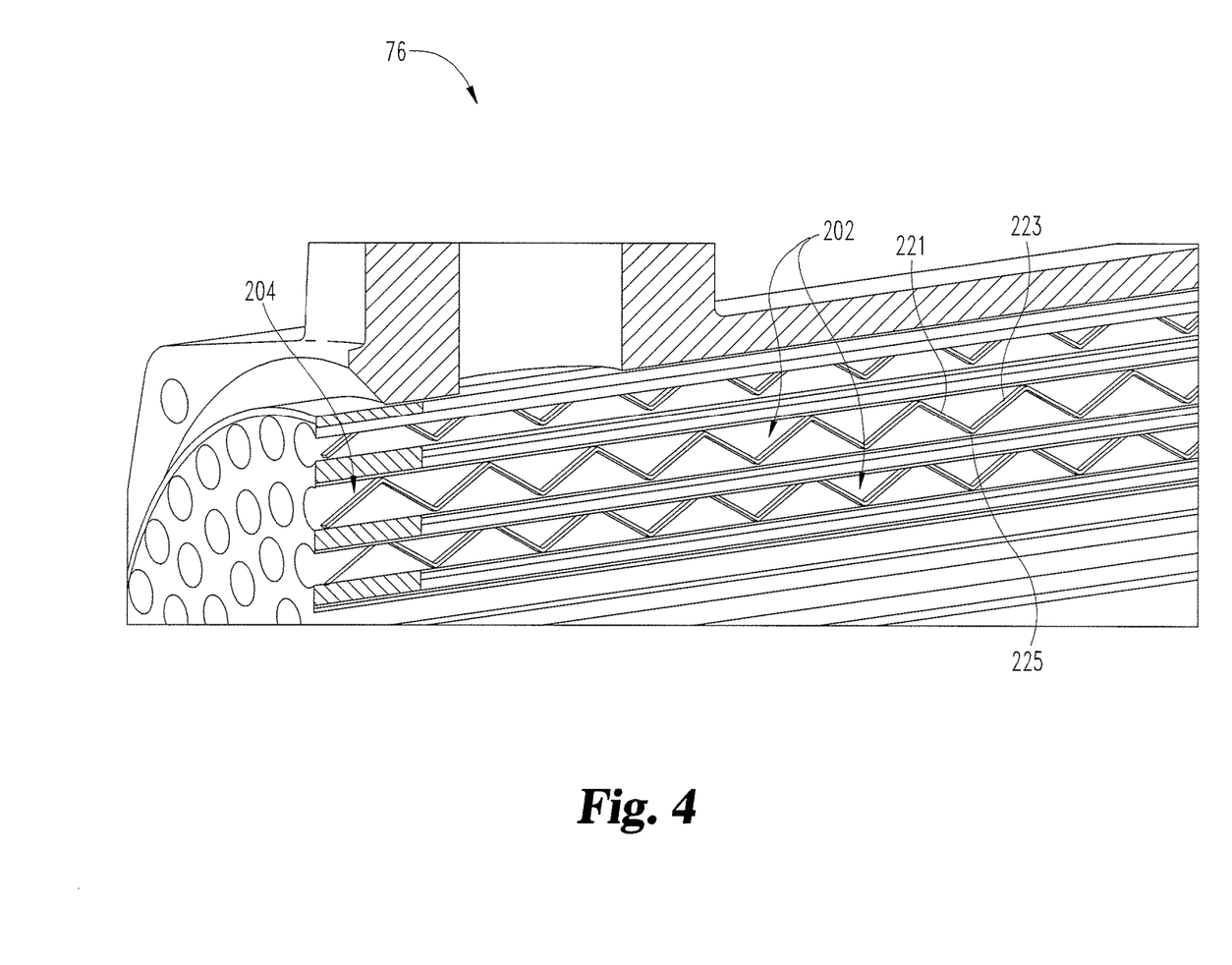
FIG. 4 is a perspective view of the heat exchanger of FIG. 3 with the turbulators formed in a substantially V-shaped pattern in response to a relative high temperature.

Forming the turbulators 204 from SMA provides the ability for the system to operate in a "cold" (FCC) state with very little turbulence, hence making the heat exchanger act more as a pipe with little pressure drop (See FIG. 3.) Once the fluid warms up to a predefined temperature, the SMA turbulator strip 204 changes to the "warm" (BC) state, in which SMA turbulator strip 204 acts as a turbulator (as shown in FIG. 4). In the warm state, SMA turbulator strip 204 creates greater turbulence in the oil, resulting in increased heat transfer to the tubes 202 and surrounding coolant. As shown specifically in FIG. 4 in the illustrative embodiment, the SMA turbulator strip 204 is shaped in a substantially V-shaped pattern having a repeating first leg 221 extending one direction and a second leg 223 extending in divergent direction from a vertex point 225. In some forms one or more of the vertex points 225 can engage with an inner surface of one or more of the walls of the tubes 202. In other forms vertex points 225 remain free from engagement with internal portions of the tubes 202 when in the warm state. It is also contemplated that SMA turbulator strip 204 may be of another configuration when in the warm state (such as twisted-tape or corkscrew).

In the illustrative embodiment, SMA turbulator strip 204 is configured to increase turbulence when in the warm state, although it is also contemplated that SMA turbulator strip 204 may be configured to increase turbulence when in the cold state in some embodiments. In either case, SMA turbulator strip 204 causes increased turbulence when in one of the warm state and the cold state, and reduced turbulence when in the other of the warm state and the cold state.

Figure 6:
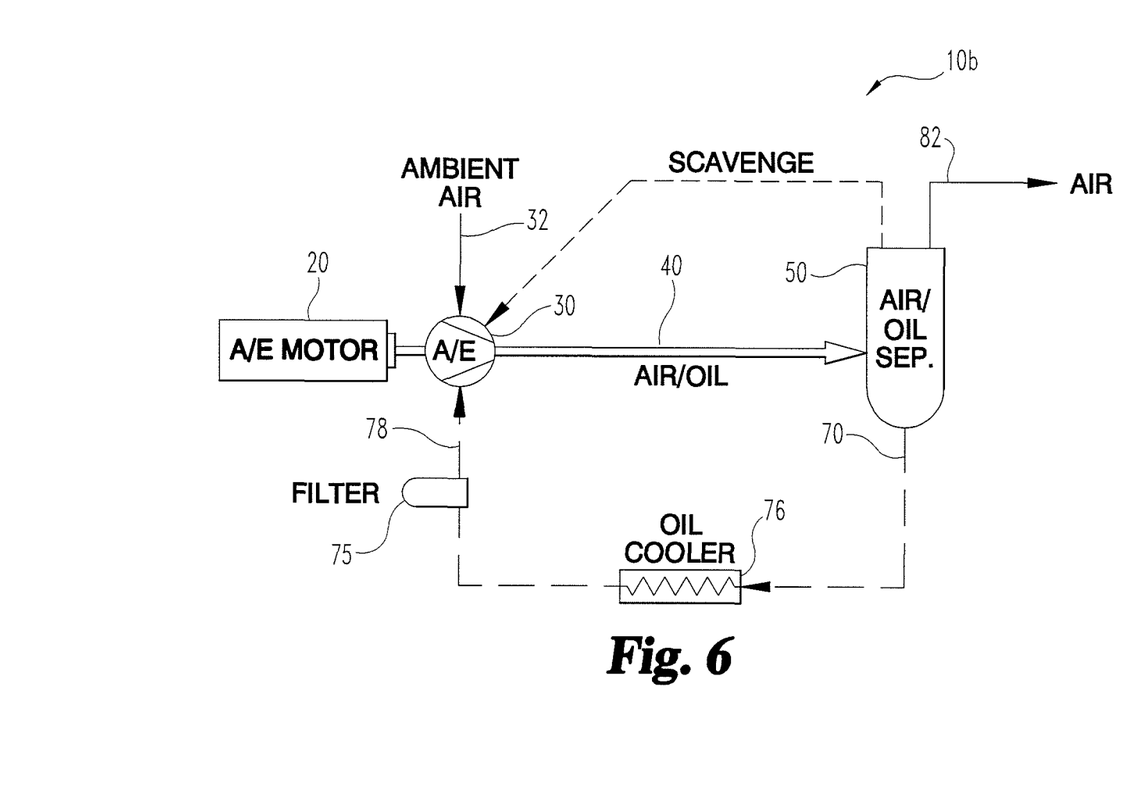
FIG. 6 is a schematic view of a portion of the compressor system of FIG. 1 illustrating a cooling system without a thermal control mixing valve according to another embodiment of the present disclosure.

With reference to FIG. 6, an alternate compressor system 10*b* is shown which is similar to the embodiment of FIG. 2, but without a thermal mixing valve. Incorporation of an SMA enhanced heat exchanger 76 can permit removal of the TCV and associated components in some embodiments. The compressor system 10*b* provides for a simplified system leading to a cost savings in both initial manufacturing and assembly of the system as well as future savings in reduced maintenance expenses.

When the oil is relatively cold (for example during compressor start-up or very cold ambient temperatures), the SMA turbulator strip(s) 204 will be in the cold state (FIG. 3), in which oil flows through the tubes 202 with little turbulence. This results in a reduced heat transfer coefficient, and less heat being transferred from the oil. Thus, the oil is returned to the compressor 30 while having lost relatively little heat. In a transitional stage, for example as the compressor warms up, the SMA turbulator strip 204 will be in a transitional configuration as it transforms from the cold state to the warm state. The turbulence, and thus the heat transfer coefficient, increase as the SMA turbulator strip(s) 204 transforms from the cold state to the warm state.

At higher temperature operating conditions, the SMA turbulator strip 204 transforms to the warm state (FIG. 4), in which the turbulence of the oil flowing through the oil cooler 76 is greatly increased. This results in an increased heat transfer coefficient, and more heat being transferred from the oil. Thus, the oil is returned to the compressor after being significantly cooled.

The compressor system 10b does not require additional components to sense temperature changes and drive valves or other devices as required with system 10a where the thermal control valve works in conjunction with the heat exchanger. These additional components create greater complexity, cost, and reliability issues. By eliminating such components, system 10b may be simplified and become more reliable.

Figure 7:
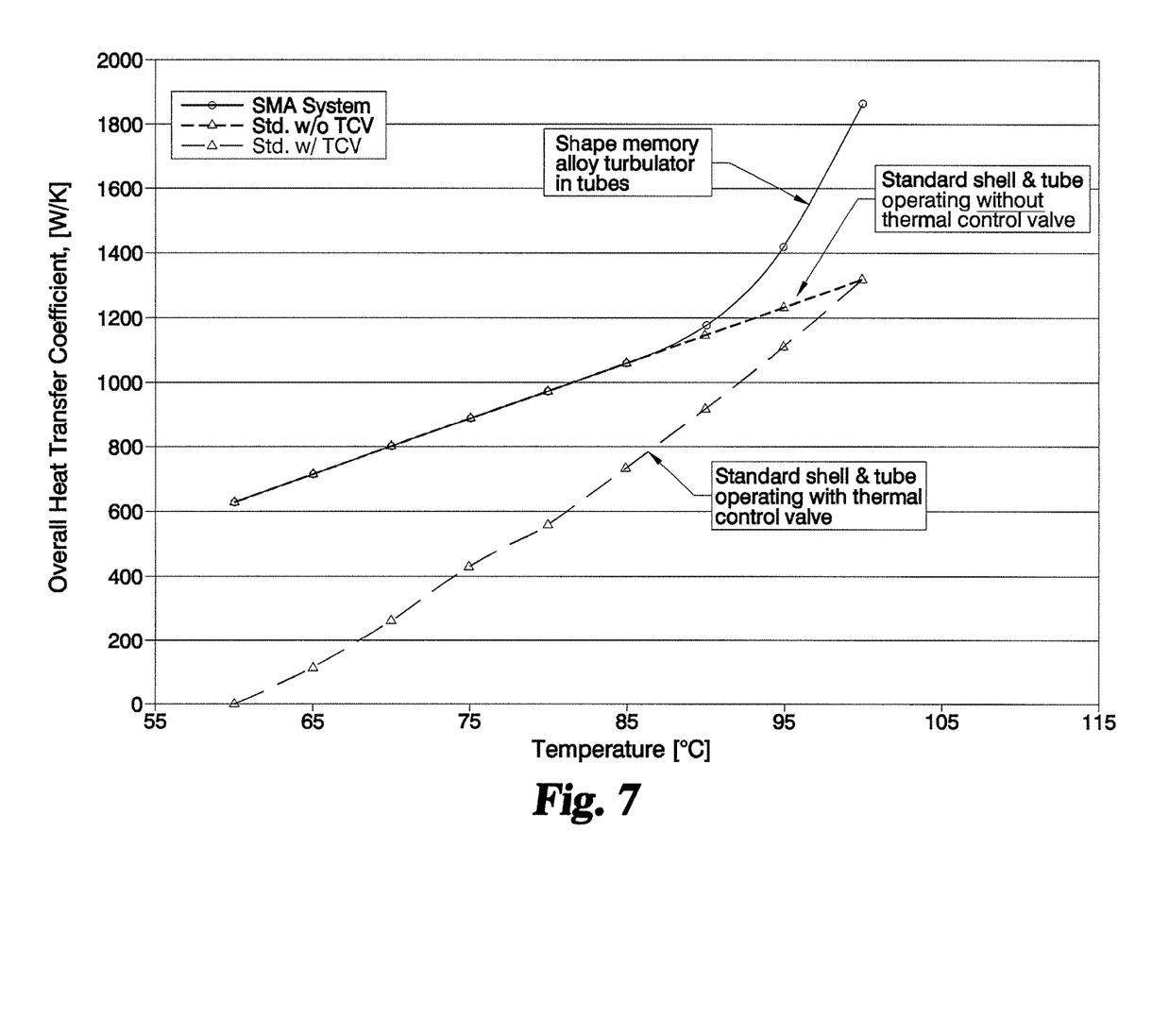
FIG. 7 is a plot showing heat transfer coefficient vs. temperature for the identified heat exchangers.

FIG. 7 illustrates exemplary performance curves for the conventional system operating with a TCV (long dashes), the conventional system operating without a TCV (short dashes), and the system utilizing the thermally active heat exchanger 76 without a TCV (solid line). While operating the conventional system without the TCV results in an increased heat transfer coefficient as compared to operating the system with the TCV, doing so can result in the undesired consequences detailed above (e.g. improper lubrication or decreased system efficiency).

In certain embodiments, it may be desirable to 'tune' the heat exchanger performance to the desired function and operating conditions of the compressor. For example, reducing the ability of the heat exchanger to transfer heat when the oil is cold can be achieved by reducing the length and/or number of tubes in it, thereby reducing cost. Since the turbulators actively generate turbulence to induce the required heat transfer in the hot condition, it is may be desirable to reduce the size of the thermally active heat exchanger with SMA turbulator strips 204 in order to reduce the cost, for example by reducing the length and/or number of tubes. With this optimization, the SMA oil cooler can achieve results similar to a standard oil cooler with a thermal control valve system, while still taking advantage of the reduced cost and simplicity of such a system. If further reductions in the heat transfer are required for the colder temperature region, a coolant flow control valve can be added to increase coolant flow rate (not shown in the drawing) as one skilled in the art would readily understand.

Figure 8:
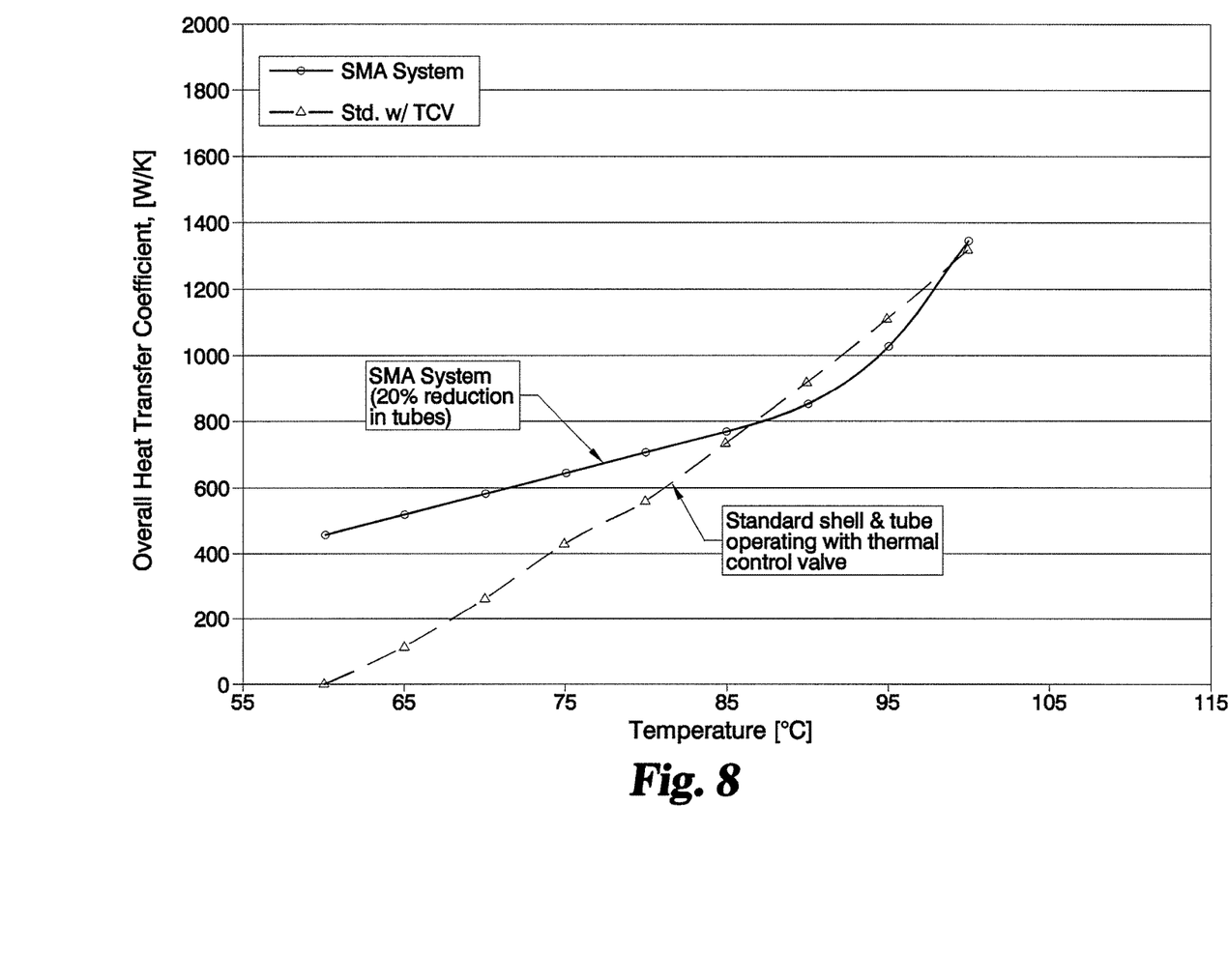
FIG. 8 is a plot showing heat transfer coefficient vs. temperature comparing a standard heat exchanger with a thermally active heat exchanger having a 20% reduction in flow tubes.

FIG. 8 illustrates example performance curves of an optimized system with a 20% reduction in tubes (solid line) as compared to the conventional system operating with a TCV. Further "tuning" can result in a desired combination of UA (heat transfer coefficient and effective flow area) to produce an optimum system.

In operation the compressor system is configured to provide compressed air at a desired temperature and pressure to external systems. The compressor systems can be used in any industrial application including, but not limited to automobile manufacturing, textile manufacturing, process industries, refineries, power plants, mining, material handling, etc. The controller permits user input to define parameters such as pressure, temperature and mass flow rate of various working fluids. The controller will send command signals to the motor to rotate at a desired operating speed in order to drive the one or more compressors and control various valving to modulate airflow rate, coolant flow rate and/or lubrication flow rates.

In the illustrative example, the compressor system includes a single-stage screw type compressor system, however, the system can operate with other types of compressors and/or with more or less stages of compressors. One or more intercoolers can be fluidly coupled to each compressor stage such that after air is compressed through a compression stage the air can be transported through an intercooler coupled to an open or a closed loop cooling system and cooled to a desired temperature via a heat transfer mechanism such as conduction and convection in tube type heat exchangers.

The compressed air can then be transported to additional compressor stages where the air is further compressed and necessarily heated to a higher temperature through a thermodynamic process. The compressed air can then be routed through subsequent intercooler stages coupled to the closed loop water cooling system to cool the air to a desired temperature without substantial loss of pressure. When the air is compressed to a final desired pressure and cooled to a desired temperature, the compressed air is discharged to a final subsystem or end load. A thermally active heat exchanger with an SMA member that operates as a turbulator strip at a predefined threshold temperature can be used to cool oil to a desired temperature prior to entering into the compressor system.

In one aspect, the present disclosure includes a compressor system comprising at least one fluid compressor for compressing a working fluid; a lubrication supply system operable for supplying lubrication fluid to the compressor; a heat exchanger for controlling the temperature of the lubrication, the heat exchanger comprising an outer shell housing a plurality of lubrication fluid passageways; at least one cooling fluid passageway in thermal contact with the plurality of lubrication fluid passageways; a shaped memory allow (SMA) member positioned within at least one of the plurality of lubrication fluid passageways and wherein the SMA member is substantially formed as an elongate flat plate below a first threshold temperature.

In refining aspects, the present disclosure system includes a compressor system wherein the SMA member includes portions formed in a substantially V-shaped pattern above a second threshold temperature; wherein the SMA member includes portions formed in an intermediate pattern between the flat plate and the V-shaped pattern at temperatures between the first and second threshold temperatures; wherein at least a portion of the substantially V-shaped SMA member engages with an internal wall of a corresponding lubrication passage way above the second threshold temperature; at least one bypass conduit for bypassing lubrication fluid past the heat exchanger; at least one mixing valve downstream of the heat exchanger and the bypass conduit to control mixing of lubrication fluid from the heat exchanger and the bypass conduit; wherein at least one of the SMA members is free from mechanical connection with a corresponding lubrication fluid passageway; wherein at least one SMA member is mechanically connected in at least one location to an internal wall of an associated lubrication fluid passageway; wherein at least one of the SMA members includes a recessed portion within a wall thereof and wherein at least one SMA member includes a protrusion extending outward from a surface of a wall.

In another aspect, the present disclosure includes a lubrication cooler comprising a housing having a plurality of lubrication fluid passageways positioned therethrough; at least one cooling fluid passageway in thermal communication with the plurality of lubrication fluid passageways; a shape memory alloy (SMA) member extending at least partially through at least one of the plurality of lubrication fluid passageways and wherein the SMA member is configured as an elongate substantially flat plate below a first threshold temperature and includes a memory shape configured as a turbulator above a second threshold temperature.

In refining aspects, the present disclosure includes a lubrication cooler wherein the SMA member includes a substantially V-shaped pattern when configured as a turbulator; wherein the SMA member includes portions formed in shape that is different from the flat plate and the V-shaped pattern at temperatures between the first and second threshold temperatures; wherein the SMA member is configured to increase turbulence of the lubrication fluid as the operating temperature increases; further comprising a plurality of SMA members positioned in at least one of the lubrication fluid passageways; wherein the plurality of SMA members extend parallel to one another along the length of at least one of the lubrication fluid passageways and wherein the SMA member engages an internal wall along portions of a corresponding lubrication passage when formed as a turbulator above the second threshold temperature.

In another aspect, the present disclosure includes a method comprising compressing a working fluid with a compression device; separating lubrication fluid and air from the working fluid; cooling the lubrication fluid with a heat exchanger; changing a shape of a turbulator positioned in the heat exchanger in response to a temperature change of the lubrication fluid; increasing the turbulence of the lubrication fluid with the turbulator in the heat exchanger as the operating temperature of the lubrication fluid increases and wherein the shape of the turbulator changes to a substantially V-shaped pattern configuration above a predefined temperature threshold.

In refining aspects, the present disclosure includes a method wherein the turbulator is substantially flat below the predefined temperature threshold; controlling a flow rate of the lubrication fluid through the heat exchanger with the turbulator.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A lubrication cooler comprising:
   a housing having a plurality of lubrication fluid passageways;
   a cooling fluid passageway in thermal communication with the plurality of lubrication fluid passageways;
   a shape memory alloy (SMA) member extending at least partially through a longitudinal length of at least one of the plurality of lubrication fluid passageways, wherein the SMA member is configured as an elongate substantially flat plate below a first threshold temperature and includes a memory shape configured as a turbulator above a second threshold temperature;
   wherein the SMA member includes a substantially V-shaped pattern with alternating opposed vertex points extending along the longitudinal length of the lubricant passageway when configured as a turbulator;
   wherein at least one of the vertex points of the SMA member engages an internal wall of the lubrication fluid passageway when formed as a turbulator above the second threshold temperature;
   wherein the SMA member includes at least one of a protruding member, a recessed member and/or an aperture formed therewith; and
   wherein the housing includes a total number of lubrication fluid passageways, and wherein at least one of the total number of lubrication fluid passageways does not include an SMA member such that fewer than all of the total number of lubrication passageways includes an SMA member.

2. The lubrication cooler of claim 1, wherein the SMA member includes portions formed in shape that is different from the flat plate and the V-shaped pattern at temperatures between the first and second threshold temperatures.

3. The lubrication cooler of claim 1, wherein the SMA member increases turbulence of the lubrication fluid as the operating temperature increases.

4. The lubrication cooler of claim 1, further comprising a plurality of SMA members positioned in one of the lubrication fluid passageways.

5. The lubrication cooler of claim 4, wherein the plurality of SMA members extend parallel to one another along the length of at least one of the lubrication fluid passageways.

6. The lubrication cooler of claim 1, wherein the SMA member is mechanically connected at a location within the at least one of the plurality of lubrication fluid passageways.

7. The lubrication cooler of claim 1, wherein the SMA member extends less than an entire length of the at least one of the plurality of lubrication fluid passageways.

8. The lubrication cooler of claim 1, wherein the at least one of the plurality of lubrication fluid passageways includes more than one SMA members.

9. The lubrication cooler of claim 8, wherein the more than one SMA members run parallel to each other along a length of the at least one of the plurality of lubrication fluid passageways.

10. The lubrication cooler of claim 8, wherein the more than one SMA members are intermittently positioned in the at least one of the plurality of lubrication fluid passageways.

* * * * *